United States Patent
Ain-Kedem

(10) Patent No.: US 10,620,457 B2
(45) Date of Patent: Apr. 14, 2020

(54) CONTROLLING VISION CORRECTION USING EYE TRACKING AND DEPTH DETECTION

(71) Applicant: Intel Corporation, Santa Clara, CA (US)

(72) Inventor: Liron Ain-Kedem, Ha (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/361,211

(22) PCT Filed: Dec. 17, 2013

(86) PCT No.: PCT/US2013/075819
§ 371 (c)(1),
(2) Date: May 28, 2014

(87) PCT Pub. No.: WO2015/094191
PCT Pub. Date: Jun. 25, 2015

(65) Prior Publication Data
US 2016/0370605 A1  Dec. 22, 2016

(51) Int. Cl.
G02C 7/08 (2006.01)
G02B 27/01 (2006.01)
G06K 9/00 (2006.01)

(52) U.S. Cl.
CPC .......... *G02C 7/083* (2013.01); *G02B 27/0172* (2013.01); *G06K 9/00604* (2013.01); *G02B 2027/0178* (2013.01)

(58) Field of Classification Search
CPC .......... G02C 7/08; G02C 7/083; G02C 7/101; G06K 9/00597; G06K 9/0061

(Continued)

(56) References Cited

U.S. PATENT DOCUMENTS 6,851,805 B2 * 2/2005 Blum ............... B29D 11/00826
351/159.03
2003/0231293 A1 * 12/2003 Blum ................... G02B 27/017
356/5.01

(Continued)

FOREIGN PATENT DOCUMENTS

JP 2002-525769 A 8/2002
KR 10-2006-0131775 A 12/2006

OTHER PUBLICATIONS

International Search Report and Written Opinion, International Application No. PCT/US2013/075819, dated Aug. 21, 2014, 11 pages.

*Primary Examiner* — Travis S Fissel
(74) *Attorney, Agent, or Firm* — Barnes & Thornburg LLP

(57) ABSTRACT

Technologies for controlling vision correction include a wearable computing device having a variable lens, an eye tracking sensor, and a depth sensor. The focal length of the variable lens is electronically adjustable. The wearable computing device determines a gaze direction of a user as a function of eye tracking sensor data received from the eye tracking sensor. The distance to an object positioned in the gaze direction is determined as a function of depth data received from the depth sensor. A new focal length is determined as a function of the distance to the object, and the focal length of the variable lens is adjusted to the new focal length. The new focal length may be selected from a set of pre-defined focal lengths based on the distance to the object or calculated based on the distance to the object. Other embodiments are described and claimed.

19 Claims, 4 Drawing Sheets

(58) Field of Classification Search
USPC .............. 351/159.03, 159.25, 159.39, 159.4,
351/159.73, 159.75–159.77, 178;
359/470, 476, 482, 615, 622, 699, 400,
359/401, 402
See application file for complete search history.

(56) References Cited

U.S. PATENT DOCUMENTS

| | | | |
|---|---|---|---|
| 2008/0246922 A1* | 10/2008 | Blum | A61B 3/0285 |
| | | | 351/233 |
| 2010/0220291 A1* | 9/2010 | Horning | G02B 27/017 |
| | | | 351/210 |
| 2012/0140322 A1* | 6/2012 | Schnell | G02B 25/004 |
| | | | 359/481 |
| 2012/0147328 A1 | 6/2012 | Yahav | |
| 2013/0021373 A1 | 1/2013 | Vaught et al. | |
| 2013/0050070 A1 | 2/2013 | Lewis et al. | |
| 2013/0147686 A1* | 6/2013 | Clavin | G06F 3/013 |
| | | | 345/8 |

* cited by examiner

CONTROLLING VISION CORRECTION USING EYE TRACKING AND DEPTH DETECTION

CROSS REFERENCE TO RELATED APPLICATIONS

This application is a national stage entry under 35 USC § 371(b) of International Application No. PCT/US2013/075819, which was filed Dec. 17, 2013.

BACKGROUND

The human eye includes a flexible lens that focuses incoming light onto the retina. When the incoming light does not focus properly on a person's retina, the person's vision is blurry or otherwise impaired. For example, people with nearsightedness (myopia) or farsightedness (hyperopia) cannot focus on distant or nearby objects, respectively. These conditions may be treated with corrective lenses such as eyeglasses or contact lenses.

Many people progressively lose their ability to focus on nearby objects as they age, a condition known as presbyopia. This condition may also be treated with corrective lenses such as eyeglasses or contact lenses. People who also require correction for distance vision may use static multi-focal lenses such as bifocals, trifocals, or progressive lenses. Those solutions provide different levels of vision correction for different parts of the lens. Thus, for close vision the user is required to adjust his or her viewing angle, head position, eye position, and similar viewing attributes. Many persons have difficulty with those adjustments. Additionally, static multi-focal lenses may be difficult to use in environments with objects at multiple distances positioned at similar viewing angles, for example, a car equipped with a GPS navigation screen.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
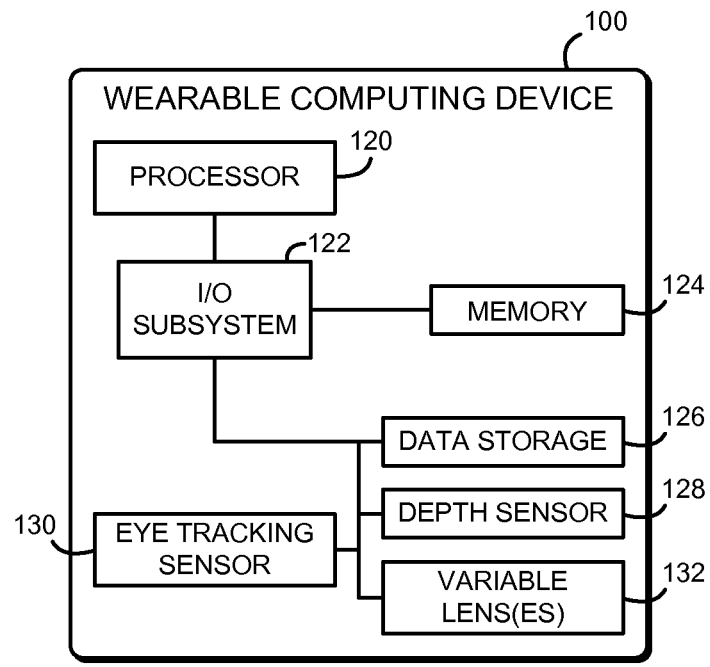
FIG. 1 is a simplified block diagram of at least one embodiment of a wearable computing device for controlling vision correction.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative wearable computing device 100 is configured to automatically control vision correction provided by the wearable computing device 100. To do so, the wearable computing device 100 tracks the gaze direction of a user of the wearable computing device 100 using an eye tracking sensor and determines the distance to an object in the user's gaze direction using a depth sensor. Given the distance to the object, the wearable computing device 100 adjusts a variable focus lens to perform vision correction for that object. The wearable computing device 100 may employ one or more power-saving strategies, such as deactivating unused components, to reduce power consumption and improve battery life. For example, as described below the wearable computing device 100 may direct a depth scan to a subset of the user's field of vision to reduce power consumed when determining distance. Controlling lens focus based on the gaze direction of the user may be a more natural form of vision correction and may allow the user to more easily acclimate to corrective lenses. Additionally, controlling lens focus may improve the user's vision through eye training or have other medical benefits.

The wearable computing device 100 may be embodied as any type of computing device capable of controlling vision correction and otherwise performing the functions described herein. For example, the wearable computing device 100 may be embodied as or include, without limitation, a head-mounted display, smart eyeglasses, a smart watch, a smart phone, a computer, a tablet computer, a laptop computer, a notebook computer, a mobile computing device, a cellular telephone, a handset, a messaging device, a distributed computing system, a multiprocessor system, a processor-based system, a consumer electronic device, and/or any other computing device configured to control vision correction for the user. As shown in FIG. 1, the illustrative wearable computing device 100 includes a processor 120, an I/O subsystem 122, a memory 124, a data storage 126, a depth sensor 128, an eye tracking sensor 130, and one or more variable lenses 132. Of course, the wearable computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

Some or all of the components of the wearable computing device 100 may be positioned close to the user's eyes, for example on an eyeglasses frame. For example, in some embodiments the depth sensor 128, eye tracking sensor 130, and variable lenses 132 may be mounted to an eyeglasses frame worn on the user's face, as described below in connection with FIG. 3. Other components of the system such as the processor 120, I/O subsystem 122, memory 124, and data storage 126 may be contained in a wearable housing that is in wireless or wired communication with components mounted to the eyeglasses frame. In other embodiments, the wearable computing device 100 may be formed by coupling appropriate components to an existing wearable device. For example, the individual components of the wearable computing device 100 may be coupled to or implemented in a head-mounted wearable computing device designed for heads-up display of information (e.g., "smart glasses").

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the wearable computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the wearable computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the wearable computing device 100, on a single integrated circuit chip.

The data storage 126 may be embodied as any type of device or devices configured for the short-term or long-term storage of data. For example, the data storage 126 may include any one or more memory devices and circuits, memory cards, hard disk drives, solid-state drives, or other data storage devices. In some embodiments, the data storage 126 stores lookup tables or other information used to provide vision correction that is customized for a particular user.

The depth sensor 128 may be embodied as any type of active or passive electronic sensor or other depth determination hardware, software, and/or firmware capable of detecting the distance between the wearable computing device 100 and an object in the user's gaze direction. For example, the depth sensor 128 may be embodied as a stereoscopic depth camera, a structured light camera, a time-of-flight camera, an infrared proximity sensor, or a directed distance measurement device that emits infrared light, laser light, ultrasound, or any other directed distance measuring technique. The depth sensor 128 may be capable of capturing depth data for all objects within a field of view of the user. Additionally or alternatively, in some embodiments the depth sensor 128 may be capable of capturing depth data for objects within a subset of the user's field of view, for example a particular restricted angle. For example, the depth sensor 128 may direct an infrared transmitter in a particular direction, providing depth data only for objects illuminated by the infrared transmitter. In some embodiments, the depth sensor 128 may be embodied as, or otherwise include, other components of the wearable computing device 100. For example, as described below, the functions of the depth sensor 128 may be provided by the eye tracking sensor 130.

The eye tracking sensor 130 may be embodied as any one or more active or passive sensors capable of determining a direction in which the user's gaze is directed. For example, in some embodiments, the eye tracking sensor 130 may use active infrared emitters and infrared detectors to track the viewer's eye movements over time. The eye tracking sensor 130 may capture the infrared light reflected off of various internal and external features of the viewer's eye and thereby calculate the direction of the viewer's gaze. In other embodiments, the eye tracking sensor 130 may be embodied as a video camera capable of recording the user's eye motion. In some embodiments, the eye tracking sensor 130 may gather eye tracking data for both of the user's eyes to improve tracking accuracy. In those embodiments, the eye tracking sensor 130 may use more than one active or passive sensor components to track both of the user's eyes. Additionally or alternatively, in some embodiments the eye tracking sensor 130 may perform three-dimensional eye tracking, which tracks both the gaze direction of the user's eye along with the distance at which the user's eye is focused. For example, the eye tracking sensor 130 may determine a viewing angle for both of the user's eyes, allowing the distance to the object to be calculated. In such embodiments the eye tracking sensor 130 may be used instead of, or in addition to, the depth sensor 128 (i.e., the output of the eye tracking sensor(s) 130 is used for eye tracking and depth determination).

The variable lenses 132 may be embodied as any lens having an electronically adjustable focal length. The focal length of an optical lens describes how the lens converges or diverges light. Therefore, the focal length of the optical lens controls the degree of vision correction provided by the lens. Rather than focal length, eyeglasses are typically described in terms of optical power, which is typically measured in diopters. However, optical power P is simply the reciprocal of the focal length f, as illustrated by Equation 1, below. Thus, focal length may be trivially converted to optical power and vice versa.

$$P = \frac{1}{f} \quad (1)$$

Any mechanism may be used to adjust the focal length of the variable lenses 132. In some embodiments the variable lenses 132 may be mechanically deformed to adjust the focal length, based on an electronic signal. Additionally or alternatively, the focal length of the variable lenses 132 may be adjusted by allowing light to pass through certain portions of the variable lenses 132. For example, the variable lenses 132 may include multiple miniature segments, each with a different focal length. A miniature electronic shutter system, for example a layer of liquid crystals, may allow light to pass through segments with the selected focal length and block light from transmitting through other segments. As another example, the focal length of the variable lenses 132 may be adjusted by adjusting the position of a moveable optical element in a compound lens system, similar to a camera focusing system.

Figure 2:
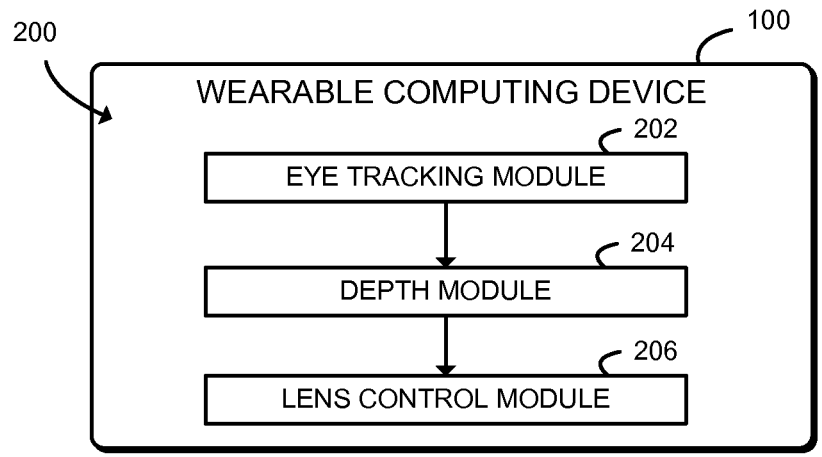
FIG. 2 is a simplified block diagram of at least one embodiment of an environment of the wearable computing device of FIG. 1.

Referring now to FIG. 2, in an embodiment, the wearable computing device 100 establishes an environment 200 during operation. The illustrative environment 200 includes an eye tracking module 202, a depth module 204, and a lens control module 206. The various modules of the environment 200 may be embodied as hardware, firmware, software, or a combination thereof.

The eye tracking module 202 is configured to receive eye tracking sensor data from the eye tracking sensor 130 and determine the direction of the user's gaze based on the eye tracking sensor data. For example, the eye tracking module 202 may determine a three-dimensional angle associated with the user's gaze, or the eye tracking module 202 may project the user's gaze onto a reference plane.

The depth module 204 is configured to receive depth data from the depth sensor 128 and determine the distance to an object positioned in the gaze direction. In some embodiments, the depth module 204 receive and/or analyze depth data for a limited region based on the gaze direction, which may reduce the energy and/or computational resources required to determine distance.

The lens control module 206 is configured to determine a new focal length of the variable lenses 132 based on the determined distance to the object in the gaze direction and adjust the variable lenses 132 accordingly. The appropriate focal length for a given distance depends on characteristics of the particular user, and may be determined based on an eyeglasses prescription or other data describing the vision of the user. In some embodiments, the variable lenses 132 may be adjusted between two pre-defined focal lengths, one appropriate for distant objects and the other for nearby objects. In other embodiments, the variable lenses 132 may be adjusted between more than two focal lengths, or the focal length may be adjusted over a continuous, or substantially continuous, range.

Figure 3:
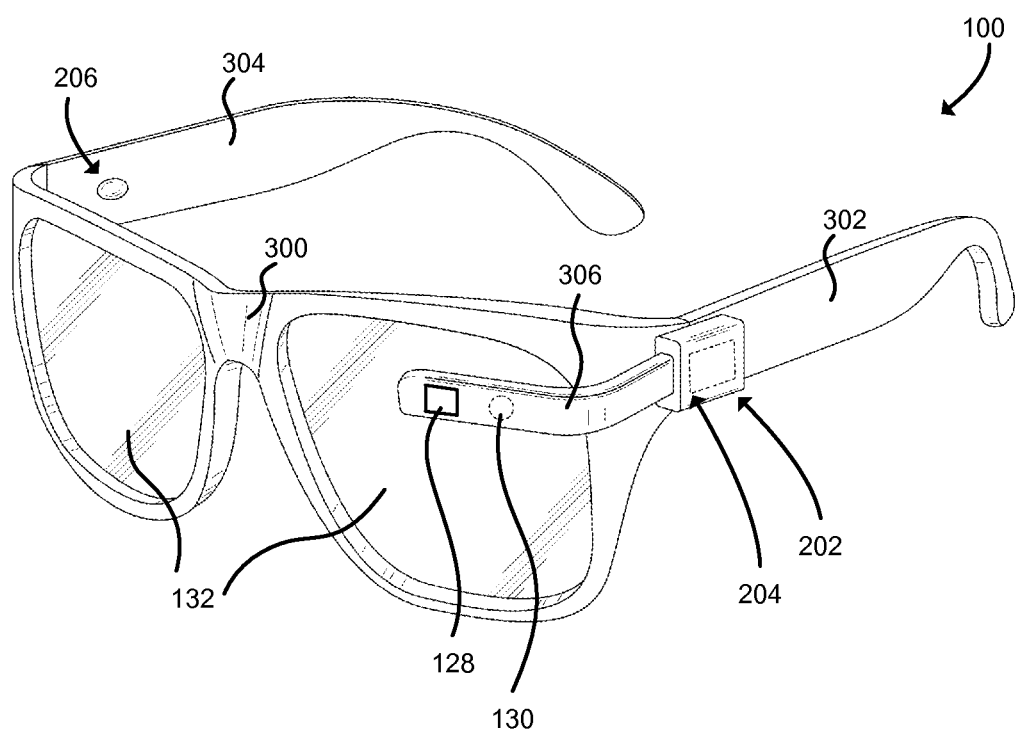
FIG. 3 is a perspective view of at least one embodiment of the wearable computing device of FIGS. 1-2.

Referring now to FIG. 3, a perspective view of an embodiment of the wearable computing device 100 is shown. In FIG. 3, the wearable computing device 100 is illustrated as a pair of eyeglasses. The eyeglasses include a frame 300 surrounding the variable lenses 132. The frame 300 is connected to a left temple 302 that extends back from the frame 300. The other side of the frame 300 is connected to a right temple 304 that extends back from the frame 300. The left temple 302 further includes a forward extension bracket 306. The depth sensor 128 and the eye tracking sensor 130 are mounted on the forward extension bracket 306. The eye tracking sensor 130 is mounted such that, in use, the eye tracking sensor 130 faces the user's eye, allowing motion of the eye to be tracked. In the illustrative embodiment, the eye tracking module 202 and the depth module 204 are housed within the left temple 302, and the lens control module 206 is housed within the right temple 304. Of course, in other embodiments the various components of the wearable computing device 100 may be mounted to different locations on the frame 300 and/or included in a separate housing that is in communication with components mounted to the frame 300. For example, the eye tracking sensor 130 may be positioned centrally on the frame 300, between the variable lenses 132. As another example, the depth sensor 128 and the eye tracking sensor 130 may be included in a head-worn device, such as the pair of eyeglasses of FIG. 3, while the other components of the wearable computing device 100 are included in a separate device, such as a smart watch, smart phone, or other computing device.

Figure 4:
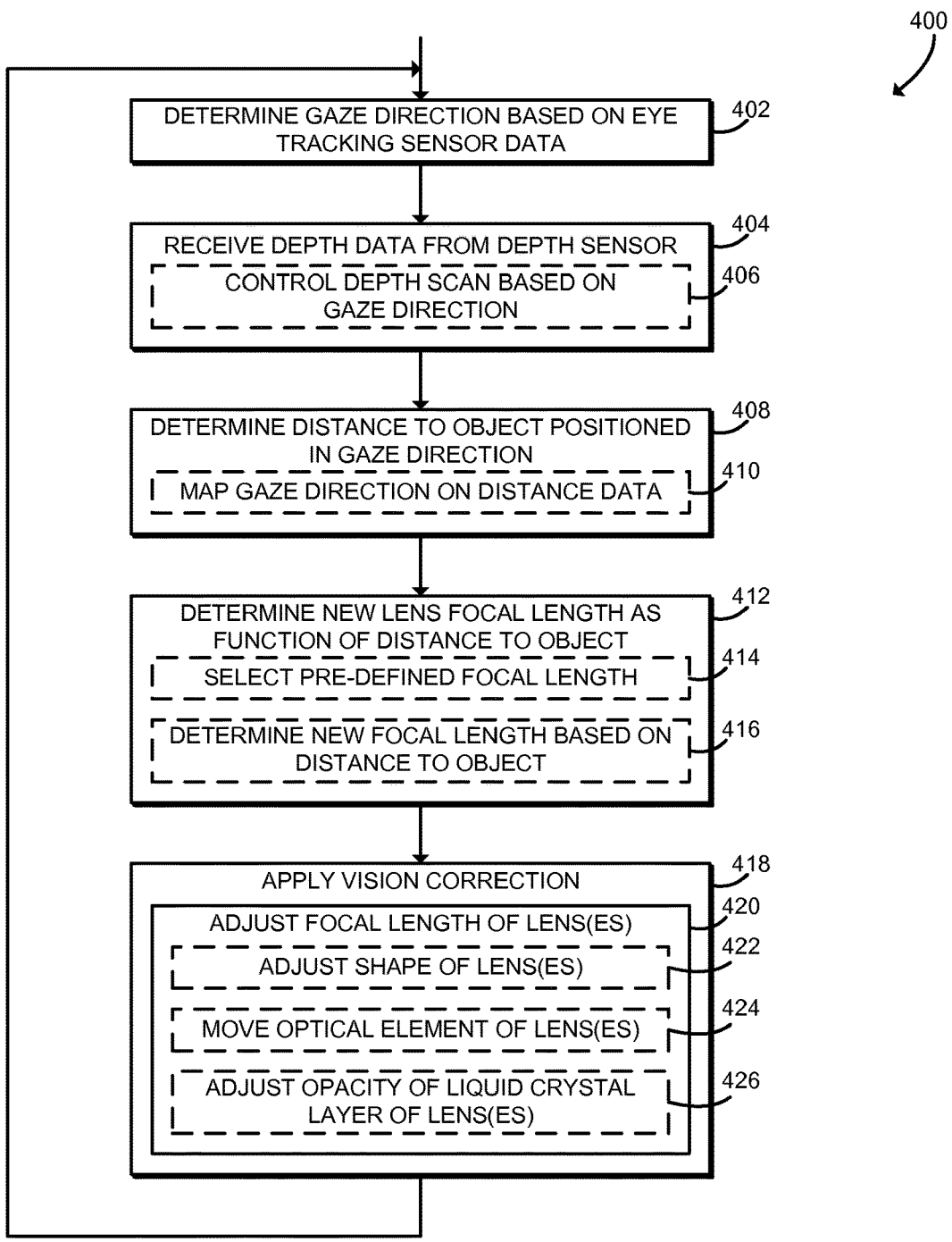
FIG. 4 is a simplified flow diagram of at least one embodiment of a method for controlling vision correction which may be executed by the computing device of FIGS. 1-3.

Referring now to FIG. 4, in use, the wearable computing device 100 may execute a method 400 for controlling vision correction. The method 400 begins with block 402, in which the wearable computing device 100 determines the gaze direction of the user based on eye tracking sensor data received from the eye tracking sensor 130. The direction of the user's gaze may be described using any convenient coordinate system or representation method. For example, the gaze direction may be embodied as an azimuth angle and a polar angle in a spherical coordinate system (i.e., (θ, φ)). As another example, the gaze direction may be embodied as two-dimensional coordinates corresponding to the gaze direction projected on a reference plane. Additionally, the gaze direction may be determined after the eye tracking sensor data is filtered by the eye tracking sensor 130 or the wearable computing device 100 to eliminate high-frequency eye movements. Because human eye movement is characterized by short pauses, called fixations, linked by rapid movements, called saccades, the accuracy and/or usability of the wearable computing device 100 may be improved through such filtering.

Figure 5:
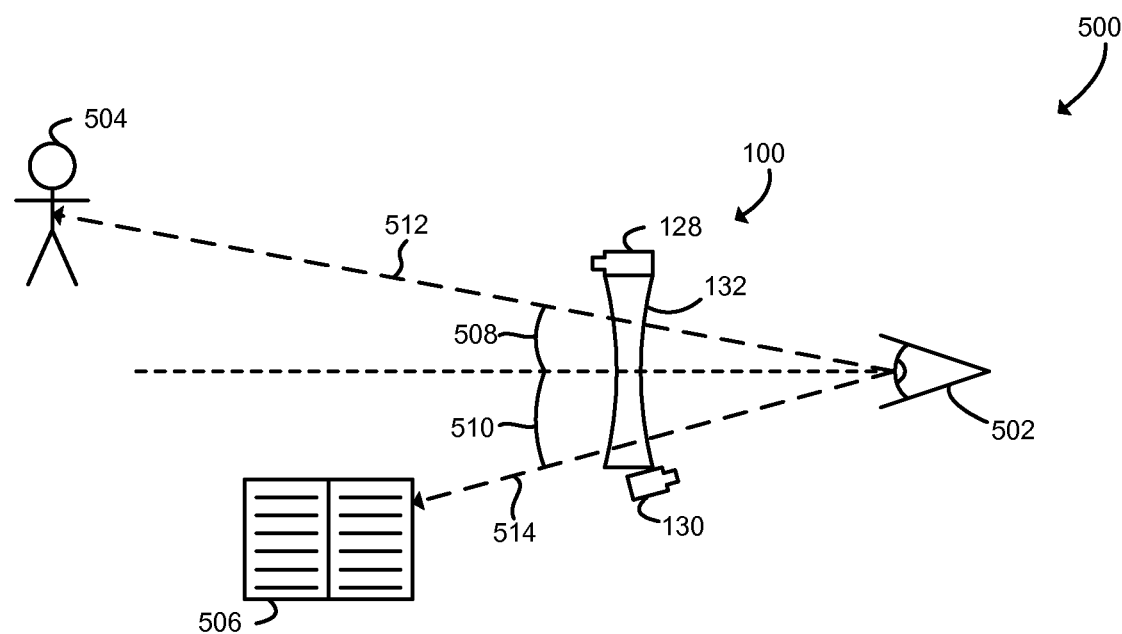
FIG. 5 is a schematic diagram illustrating use of the wearable computing device of FIGS. 1-3.

An illustrative gaze direction of a user is illustrated in FIG. 5. Schematic diagram 500 illustrates a variable lens 132 of the wearable computing device 100 positioned between an eye 502 of the user and the objects 504, 506. In the illustrative diagram 500, the object 504 is a person and the object 506 is a book; however, these examples are merely illustrative and any objects detectable by the depth sensor 128 may be substituted. The eye tracking sensor 130 is positioned near the variable lens 132 to allow measurement of the user's eye 502. The angles 508, 510 represent the user's gaze direction to the objects 504, 506, respectively. Those angles 508, 510 are determined based on eye tracking sensor data produced by the eye tracking sensor 130. It should be noted that diagram 500 is a simplified two-dimensional representation, and each gaze direction may be embodied as a pair of angles in a spherical coordinate system as described above.

Referring back to FIG. 4, in block 404 the wearable computing device 100 receives depth data from the depth sensor 128. In some embodiments, the wearable computing device 100 may receive depth information for all objects within the field of view of the depth sensor 128. For example, the wearable computing device 100 may receive a full frame or frames of depth data produced by a stereoscopic depth camera, a structured light camera, or a time-of-flight depth camera. In those examples, the field of view of the depth sensor 128 may correspond to the field of view of a user through the variable lenses 132. Additionally or alternatively, in some embodiments in block 406 the wearable computing device 100 may control the depth sensor 128 to perform a depth scan based on the determined gaze direction. For example, the wearable computing device 100 may direct an infrared light source to transmit in the gaze direction, illuminating only objects in the gaze direction. As another example, the wearable computing device 100 may only analyze a strict subset of the user's field of view based on the gaze direction. That is, the wearable computing device 100 may analyze depth data for a portion of the field of view of the user that contains the gaze direction but is less than the entire field of view of the user. Directing the depth sensor 128 in that manner may reduce the computing resources, time, and/or energy required for determining depth. In other embodiments (not illustrated) the depth data may be determined from the eye tracking sensor data alone. For example, three-dimensional eye tracking systems may be capable of determining the angle and focused distance of the user's eye without a separate depth sensor 128.

The values of the depth data used by the wearable computing device 100 may have fairly coarse resolution; for example, the depth data may merely indicate that an object is relatively "near" or "far." Limiting depth value resolution may also improve power and/or computational efficiency of the wearable computing device 100. In some embodiments, the possible values of depth data may be non-linear; for example, depth value resolution may be increased for nearby objects while distant objects may be represented merely as relatively "far" or "at infinity." Of course, in other embodiments the depth data may be linear with high resolution.

In block 408, the wearable computing device 100 determines the distance to the object positioned in the gaze direction. To determine the distance, the wearable computing device 100 may correlate the gaze direction to a particular segment of the depth data previously received. In some embodiments, in block 410 the depth data may be represented as a two-dimensional map of elements corresponding to a frame or frames of depth data generated by the depth sensor 128. The wearable computing device 100 may map the gaze direction onto a particular element of that depth map, and use the depth sensor data to determine the distance to the object. As described above, in embodiments that direct the depth sensor 128 in the gaze direction, the wearable computing device 100 may determine the distance based on a strict subset of depth data elements, or in some embodiments a single depth data value. To illustrate, referring again to FIG. 5, the wearable computing device 100 may map the angle 508 on the depth data to determine a distance 512 to the object 504. Similarly, the wearable computing device 100 may map the angle 510 on the depth data to determine a distance 514 to the object 506.

In block 412, the wearable computing device 100 determines a new focal length for the variable lenses 132 as a function of the distance to the object in the gaze direction. The particular relationship between focal length and distance may depend on the particular user of the wearable computing device 100. For example, the appropriate focal length may be determined based on the eyeglasses prescription of the user. In some embodiments, in block 414 the wearable computing device 100 may select the new focal length from a set of pre-defined focal lengths. For example, the pre-defined focal lengths may be stored in a lookup table, indexed by the distance to the object. In some embodiments, the table may include two pre-defined focal lengths, one for close vision correction and the other for distance vision correction. The wearable computing device 100 may select the appropriate focal length by comparing the distance to the object to a predefined threshold distance, for example one meter. In some embodiments, in block 416 the wearable computing device 100 may determine the new focal length based on the distance to the object. For example, the wearable computing device 100 may calculate the new focal length using a mathematical formula, simulation, or model of the user's eyeglasses prescription. Additionally or alternatively, in some embodiments the wearable computing device 100 may apply different strategies for determining the focal length based on the distance to the object. For example, the wearable computing device 100 may select a pre-defined focal length as in block 414 for objects more distant than a predefined threshold distance, and determine the new focal length as in block 416 for objects closer than the predefined threshold distance.

In block 418, the wearable computing device 100 applies the vision correction determined in block 412. That is, the wearable computing device 100 may apply vision correction for distance vision, close vision, or any intermediate distance. In block 420, the wearable computing device 100 adjusts the focal length of the variable lenses 132. The wearable computing device 100 may send control signals, activate actuators, or perform any other control technique to change the focal length. In some embodiments, in block 422 the wearable computing device 100 adjusts the focal length by adjusting the shape of the variable lenses 132. For example, the wearable computing device 100 may activate electrical actuators to stretch or compress a lens made of elastomeric material. In some embodiments, in block 424 the wearable computing device 100 moves one or more optical elements of the variable lenses 132. Moving the optical element may adjust the focal length of the variable lenses 132. In some embodiments, in block 426, the wearable computing device 100 adjusts the opacity of a liquid crystal layer of the variable lenses 132, allowing light to be transmitted through different segments of the variable lenses 132. After adjusting the focal length, the method 400 loops back to block 402 to continue controlling vision correction.

To illustrate operation of the wearable computing device 100, and referring again to FIG. 5, consider that the user's eye 502 is focused on the person 504. As described above, the wearable computing device 100 determines the angle 508 for the user gaze direction based on eye tracking data, and in turn determines the distance 512 based on depth data and the eye tracking data. Given the distance 512, the wearable computing device 100 determines a new focal length and adjusts the variable lenses 132 accordingly. For example, assuming that the person 504 is relatively far away and that the user is nearsighted, the wearable computing device 100 may determine that the appropriate focal length is equivalent to a diopter of −4.00, and may adjust the variable lenses 132 accordingly.

Continuing the illustration, consider that the user shifts his or her gaze to the book 506. As described above, the wearable computing device 100 determines the angle 510 for the gaze direction based on eye tracking data and in turn determines the distance 514 based on depth data and the eye tracking data. Given the distance 514, the wearable computing device 100 determines an appropriate focal length and adjusts the variable lenses 132 accordingly. For example, assuming that the book 506 is relatively close and that the user typically requires reading glasses, the wearable computing device 100 may determine that the appropriate focal length is equivalent to a diopter of +1.00, and may adjust the variable lenses 132 accordingly.

EXAMPLES

Illustrative examples of the technologies disclosed herein are provided below. An embodiment of the technologies may include any one or more, and any combination of, the examples described below.

Example 1 includes a wearable computing device to control vision correction, the wearable computing device comprising: a variable lens having a focal length that is electronically adjustable; an eye tracking sensor to generate eye tracking sensor data; an eye tracking module to determine a gaze direction of a user of the wearable computing device as a function of the eye tracking sensor data received from the eye tracking sensor; a depth module to determine, as a function of depth data associated with an object positioned in the gaze direction, a distance to the object positioned in the gaze direction; and a lens control module to: (i) determine a new focal length for the variable lens as a function of the distance to the object and (ii) adjust the focal length of the variable lens to the new focal length.

Example 2 includes the subject matter of Example 1, and wherein the eye tracking sensor comprises an eye tracking camera or an infrared receiver.

Example 3 includes the subject matter of any of Examples 1 and 2, and wherein the eye tracking sensor is to generate eye tracking sensor data indicative of a gaze direction of each of two eyes of the user.

Example 4 includes the subject matter of any of Examples 1-3, and wherein the depth module is further to analyze a strict subset of the user's field of vision based on the determined gaze direction.

Example 5 includes the subject matter of any of Examples 1-4, and further including a depth sensor to generate the depth data.

Example 6 includes the subject matter of any of Examples 1-5, and wherein the depth sensor comprises a stereoscopic camera.

Example 7 includes the subject matter of any of Examples 1-6, and wherein the depth sensor comprises a structured light camera.

Example 8 includes the subject matter of any of Examples 1-7, and wherein the depth sensor comprises an infrared proximity sensor.

Example 9 includes the subject matter of any of Examples 1-8, and wherein the depth sensor comprises a time-of-flight camera.

Example 10 includes the subject matter of any of Examples 1-9, and wherein the eye tracking sensor is further to generate the depth data.

Example 11 includes the subject matter of any of Examples 1-10, and wherein to determine the new focal length as a function of the distance to the object comprises to calculate the new focal length as a function of the distance to the object.

Example 12 includes the subject matter of any of Examples 1-11, and wherein to determine the new focal length as a function of the distance to the object comprises to select the new focal length from a set of pre-defined focal lengths based on the distance to the object.

Example 13 includes the subject matter of any of Examples 1-12, and wherein to determine the new focal length as a function of the distance to the object comprises to: determine whether the distance to the object has a predefined relationship to a threshold distance; select a first focal length from a set of pre-defined focal lengths in response to a determination that the distance to the object has the predefined relationship to the threshold distance; and select a second focal length from the set of pre-defined focal lengths in response to a determination that the distance to the object does not have the predefined relationship to the threshold distance.

Example 14 includes the subject matter of any of Examples 1-13, and wherein to determine whether the distance to the object has the predefined relationship to the threshold distance comprises to determine whether the distance exceeds the threshold distance.

Example 15 includes the subject matter of any of Examples 1-14, and wherein to determine the new focal length as a function of the distance to the object comprises to: determine whether the distance to the object has a predefined relationship to a threshold distance; select a first focal length from a set of pre-defined focal lengths in response to a determination that the distance to the object has the predefined relationship to the threshold distance; and calculate the focal length as a function of the distance to the object in response to a determination that the distance to the object does not have the predefined relationship to the threshold distance.

Example 16 includes the subject matter of any of Examples 1-15, and wherein to determine whether the distance to the object has the predefined relationship to the threshold distance comprises to determine whether the distance exceeds the threshold distance.

Example 17 includes the subject matter of any of Examples 1-16, and wherein to adjust the focal length comprises to mechanically deform the variable lens.

Example 18 includes the subject matter of any of Examples 1-17, and wherein to adjust the focal length comprises to adjust a liquid crystal layer of the variable lens.

Example 19 includes the subject matter of any of Examples 1-18, and wherein to adjust the focal length comprises to adjust the position of a movable optical element of the variable lens.

Example 20 includes the subject matter of any of Examples 1-19, and wherein the wearable computing device comprises eyeglasses.

Example 21 includes a method for controlling vision correction of a wearable computing device, the method comprising: receiving, by the wearable computing device, eye tracking sensor data from an eye tracking sensor of the wearable computing device; determining, by the wearable computing device, a gaze direction of a user of the wearable computing device as a function of the eye tracking sensor data; receiving, by the wearable computing device, depth data associated with an objection positioned in the gaze direction; determining, by the wearable computing device as a function of the depth data, a distance to the object positioned in the gaze direction; determining, by the wearable computing device, a new focal length for a variable lens of the wearable computing device as a function of the distance to the object; and adjusting, by the wearable computing device, the focal length of the variable lens to the new focal length.

Example 22 includes the subject matter of Example 21, and wherein receiving the eye tracking sensor data comprises receiving eye tracking sensor data from an eye tracking camera or an infrared receiver of the wearable computing device.

Example 23 includes the subject matter of any of Examples 21 and 22, and wherein receiving the eye tracking sensor data comprises receiving eye tracking sensor data indicative of a gaze direction of each of two eyes of the user.

Example 24 includes the subject matter of any of Examples 21-23, and wherein receiving the depth data comprises analyzing a strict subset of the user's field of vision based on the determined gaze direction.

Example 25 includes the subject matter of any of Examples 21-24, and wherein receiving the depth data comprises receiving depth data from a depth sensor of the wearable computing device.

Example 26 includes the subject matter of any of Examples 21-25, and wherein receiving the depth data comprises receiving depth data from a stereoscopic camera of the wearable computing device.

Example 27 includes the subject matter of any of Examples 21-26, and wherein receiving the depth data comprises receiving depth data from a structured light camera of the wearable computing device.

Example 28 includes the subject matter of any of Examples 21-27, and wherein receiving the depth data comprises receiving depth data from an infrared proximity sensor of the wearable computing device.

Example 29 includes the subject matter of any of Examples 21-28, and wherein receiving the depth data comprises receiving depth data from a time-of-flight camera of the wearable computing device.

Example 30 includes the subject matter of any of Examples 21-29, and wherein receiving the depth data comprises receiving depth data from the eye tracking sensor.

Example 31 includes the subject matter of any of Examples 21-30, and wherein determining the new focal length as a function of the distance to the object comprises calculating the new focal length as a function of the distance to the object.

Example 32 includes the subject matter of any of Examples 21-31, and wherein determining the new focal length as a function of the distance to the object comprises selecting the new focal length from a set of pre-defined focal lengths based on the distance to the object.

Example 33 includes the subject matter of any of Examples 21-32, and wherein determining the new focal length as a function of the distance to the object comprises: determining whether the distance to the object has a pre-defined relationship to a threshold distance; selecting a first focal length from a set of pre-defined focal lengths in response to determining that the distance to the object has the predefined relationship to the threshold distance; and selecting a second focal length from the set of pre-defined focal lengths in response to determining that the distance to the object does not have the predefined relationship to the threshold distance.

Example 34 includes the subject matter of any of Examples 21-33, and wherein determining whether the distance to the object has the predefined relationship to the threshold distance comprises determining whether the distance exceeds the threshold distance.

Example 35 includes the subject matter of any of Examples 21-34, and wherein determining the new focal length as a function of the distance to the object comprises: determining whether the distance to the object has a pre-defined relationship to a threshold distance; selecting a first focal length from a set of pre-defined focal lengths in response to determining that the distance to the object has the predefined relationship to the threshold distance; and calculating the focal length as a function of the distance to the object in response to determining that the distance to the object does not have the predefined relationship to the threshold distance.

Example 36 includes the subject matter of any of Examples 21-35, and wherein determining whether the distance to the object has the predefined relationship to the threshold distance comprises determining whether the distance exceeds the threshold distance.

Example 37 includes the subject matter of any of Examples 21-36, and wherein adjusting the focal length comprises mechanically deforming the variable lens.

Example 38 includes the subject matter of any of Examples 21-37, wherein adjusting the focal length comprises adjusting a liquid crystal layer of the variable lens.

Example 39 includes the subject matter of any of Examples 21-38, wherein adjusting the focal length comprises adjusting the position of a movable optical element of the variable lens.

Example 40 includes a computing device comprising: a processor; and a memory having stored therein a plurality of instructions that when executed by the processor cause the computing device to perform the method of any of Examples 21-39.

Example 41 includes one or more machine-readable storage media comprising a plurality of instructions stored thereon that in response to being executed result in a wearable computing device performing the method of any of Examples 21-39.

Example 42 includes a wearable computing device comprising means for performing the method of any of Examples 21-39.

Example 43 includes a wearable computing device to control vision correction, the wearable computing device comprising: means for receiving eye tracking sensor data from an eye tracking sensor of the wearable computing device; means for determining a gaze direction of a user of the wearable computing device as a function of the eye tracking sensor data; means for receiving depth data associated with an objection positioned in the gaze direction; means for determining, as a function of the depth data, a distance to the object positioned in the gaze direction; means for determining a new focal length for a variable lens of the wearable computing device as a function of the distance to the object; and means for adjusting the focal length of the variable lens to the new focal length.

Example 44 includes the subject matter of Example 43, and wherein the means for receiving the eye tracking sensor data comprises means for receiving eye tracking sensor data from an eye tracking camera or an infrared receiver of the wearable computing device.

Example 45 includes the subject matter of any of Examples 43 and 44, and wherein the means for receiving the eye tracking sensor data comprises means for receiving eye tracking sensor data indicative of a gaze direction of each of two eyes of the user.

Example 46 includes the subject matter of any of Examples 43-45, and wherein the means for receiving the depth data comprises means for analyzing a strict subset of the user's field of vision based on the determined gaze direction.

Example 47 includes the subject matter of any of Examples 43-46, and wherein the means for receiving the depth data comprises means for receiving depth data from a depth sensor of the wearable computing device.

Example 48 includes the subject matter of any of Examples 43-47, and wherein the means for receiving the depth data comprises means for receiving depth data from a stereoscopic camera of the wearable computing device.

Example 49 includes the subject matter of any of Examples 43-48, and wherein the means for receiving the depth data comprises means for receiving depth data from a structured light camera of the wearable computing device.

Example 50 includes the subject matter of any of Examples 43-49, and wherein the means for receiving the depth data comprises means for receiving depth data from an infrared proximity sensor of the wearable computing device.

Example 51 includes the subject matter of any of Examples 43-50, and wherein the means for receiving the depth data comprises means for receiving depth data from a time-of-flight camera of the wearable computing device.

Example 52 includes the subject matter of any of Examples 43-51, and wherein the means for receiving the depth data comprises means for receiving depth data from the eye tracking sensor.

Example 53 includes the subject matter of any of Examples 43-52, and wherein the means for determining the new focal length as a function of the distance to the object comprises means for calculating the new focal length as a function of the distance to the object.

Example 54 includes the subject matter of any of Examples 43-53, and wherein the means for determining the new focal length as a function of the distance to the object comprises means for selecting the new focal length from a set of pre-defined focal lengths based on the distance to the object.

Example 55 includes the subject matter of any of Examples 43-54, and wherein the means for determining the new focal length as a function of the distance to the object comprises: means for determining whether the distance to the object has a predefined relationship to a threshold distance; means for selecting a first focal length from a set of pre-defined focal lengths in response to determining that the distance to the object has the predefined relationship to the threshold distance; and means for selecting a second focal length from the set of pre-defined focal lengths in response to determining that the distance to the object does not have the predefined relationship to the threshold distance.

Example 56 includes the subject matter of any of Examples 43-55, and wherein the means for determining whether the distance to the object has the predefined relationship to the threshold distance comprises means for determining whether the distance exceeds the threshold distance.

Example 57 includes the subject matter of any of Examples 43-56, and wherein the means for determining the new focal length as a function of the distance to the object comprises: means for determining whether the distance to the object has a predefined relationship to a threshold distance; means for selecting a first focal length from a set of pre-defined focal lengths in response to determining that the distance to the object has the predefined relationship to the threshold distance; and means for calculating the focal length as a function of the distance to the object in response to determining that the distance to the object does not have the predefined relationship to the threshold distance.

Example 58 includes the subject matter of any of Examples 43-57, and wherein the means for determining whether the distance to the object has the predefined relationship to the threshold distance comprises means for determining whether the distance exceeds the threshold distance.

Example 59 includes the subject matter of any of Examples 43-58, and wherein the means for adjusting the focal length comprises means for mechanically deforming the variable lens.

Example 60 includes the subject matter of any of Examples 43-59, and wherein the means for adjusting the focal length comprises means for adjusting a liquid crystal layer of the variable lens.

Example 61 includes the subject matter of any of Examples 43-60, and wherein the means for adjusting the focal length comprises means for adjusting the position of a movable optical element of the variable lens.

The invention claimed is:

1. A wearable computing device to control vision correction, the wearable computing device comprising:
   a variable lens having a focal length that is electronically adjustable;
   an eye tracking sensor to generate eye tracking sensor data;
   an eye tracking module to determine a gaze direction of a user of the wearable computing device as a function of the eye tracking sensor data received from the eye tracking sensor;
   a depth module to determine, as a function of depth data associated with an object positioned in the gaze direction, a distance to the object positioned in the gaze direction; and
   a lens control module to: (i) determine a new focal length for the variable lens based on two or more focal length determination techniques in which a first focal length determination technique or a second focal length determination technique is chosen as a function of the distance to the object and (ii) adjust the focal length of the variable lens to the new focal length;
   wherein to determine the new focal length comprises to: (i) choose the first focal length determination technique in response to a determination the distance to the object is greater than a threshold distance, wherein in response to choosing the first focal length determination technique, select the new focal length from a set of pre-defined focal lengths associated with the user, and (ii) choose the second focal length determination technique in response to a determination the distance to the object is less than or equal to the threshold distance, wherein in response to choosing the second focal length determination technique, calculate the new focal length as a function of the distance to the object.

2. The wearable computing device of claim 1, wherein the eye tracking sensor is to generate eye tracking sensor data indicative of a gaze direction of each of two eyes of the user.

3. The wearable computing device of claim 1, wherein the depth data is associated with a strict subset of the user's field of vision that includes the determined gaze direction.

4. The wearable computing device of claim 1, further comprising a depth sensor to generate the depth data.

5. The wearable computing device of claim 1, wherein the eye tracking sensor is further to generate the depth data.

6. The wearable computing device of claim 1, wherein to determine the new focal length as a function of the distance to the object comprises to:
   determine whether the distance to the object has a pre-defined relationship to a threshold distance;
   select a first focal length from a set of pre-defined focal lengths in response to a determination that the distance to the object has the predefined relationship to the threshold distance; and
   select a second focal length from the set of pre-defined focal lengths in response to a determination that the distance to the object does not have the predefined relationship to the threshold distance.

7. The wearable computing device of claim 1, wherein the wearable computing device comprises eyeglasses.

8. A method for controlling vision correction of a wearable computing device, the method comprising:
   receiving, by the wearable computing device, eye tracking sensor data from an eye tracking sensor of the wearable computing device;
   determining, by the wearable computing device, a gaze direction of a user of the wearable computing device as a function of the eye tracking sensor data;
   receiving, by the wearable computing device, depth data associated with an object positioned in the gaze direction;
   determining, by the wearable computing device as a function of the depth data, a distance to the object positioned in the gaze direction;
   determining, by the wearable computing device, a new focal length for a variable lens of the wearable computing device based on two or more focal length determination techniques in which a first focal length determination technique or a second focal length determination technique is chosen as a function of the distance to the object, wherein determining the new focal length comprises: (i) choosing the first focal length determination technique in response to determining the distance to the object is greater than a threshold distance, wherein in response to choosing the first focal length determination technique, selecting the new focal length from a set of pre-defined focal lengths associated with the user, and (ii]) choosing the second focal length determination technique in response to a determination the distance the object is less than or equal to the threshold distance, wherein in response to choosing the second focal length determination technique, calculating the new focal length as a function of the distance to the object; and
   adjusting, by the wearable computing device, the focal length of the variable lens to the new focal length.

9. The method of claim 8, wherein receiving the eye tracking sensor data comprises receiving eye tracking sensor data indicative of a gaze direction of each of two eyes of the user.

10. The method of claim 8, wherein receiving the depth data comprises receiving depth data associated with a strict subset of the user's field of vision that includes the determined gaze direction.

11. The method of claim 8, wherein receiving the depth data comprises receiving depth data from a depth sensor of the wearable computing device.

12. The method of claim 8, wherein receiving the depth data comprises receiving depth data from the eye tracking sensor.

13. The method of claim 8, wherein determining the new focal length as a function of the distance to the object comprises:
   determining whether the distance to the object has a predefined relationship to a threshold distance;
   selecting a first focal length from a set of pre-defined focal lengths in response to determining that the distance to the object has the predefined relationship to the threshold distance; and
   selecting a second focal length from the set of pre-defined focal lengths in response to determining that the distance to the object does not have the predefined relationship to the threshold distance.

14. One or more non-transitory, computer-readable storage media comprising a plurality of instructions that in response to being executed cause a wearable computing device to:
   receive eye tracking sensor data from an eye tracking sensor of the wearable computing device;
   determine a gaze direction of a user of the wearable computing device as a function of the eye tracking sensor data;
   receive depth data associated with an objection positioned in the gaze direction;
   determine, as a function of the depth data, a distance to the object positioned in the gaze direction;
   determine a new focal length for a variable lens of the wearable computing device based on two or more focal length determination techniques in which a first focal length determination technique or a second focal length determination technique is chosen as a function of the distance to the object, wherein to determine the new focal length comprises to: (i) choose the first focal length determination technique in response to a determination the distance to the object is greater than a threshold distance, wherein in response to choosing the first focal length determination technique, select the new focal length from a set of pre-defined focal lengths associated with the user, and (ii) choose the second focal length determination technique in response to a determination the distance to the object is less than or equal to the threshold distance, wherein the response to choose the second focal length determination technique, calculate the new focal length as a function of the distance to the object; and
   adjust the focal length of the variable lens to the new focal length.

15. The one or more non-transitory, computer-readable storage media of claim 14, wherein to receive the eye tracking sensor data comprises to receive eye tracking sensor data indicative of a gaze direction of each of two eyes of the user.

16. The one or more non-transitory, computer-readable storage media of claim 14, wherein to receive the depth data comprises to receive depth data associated with a strict subset of the user's field of vision that includes the determined gaze direction.

17. The one or more non-transitory, computer-readable storage media of claim 14, wherein to receive the depth data comprises to receive depth data from a depth sensor of the wearable computing device.

18. The one or more non-transitory, computer-readable storage media of claim 14, wherein to receive the depth data comprises to receive depth data from the eye tracking sensor.

19. The one or more non-transitory, computer-readable storage media of claim 14, wherein to determine the new focal length as a function of the distance to the object comprises to:
- determine whether the distance to the object has a pre-defined relationship to a threshold distance;
- select a first focal length from a set of pre-defined focal lengths in response to determining that the distance to the object has the predefined relationship to the threshold distance; and
- select a second focal length from the set of pre-defined focal lengths in response to determining that the distance to the object does not have the predefined relationship to the threshold distance.

\* \* \* \* \*